US008964615B2

(12) United States Patent
Sikri et al.

(10) Patent No.: US 8,964,615 B2
(45) Date of Patent: Feb. 24, 2015

(54) METHODS AND DEVICES FOR FACILITATING EARLY HEADER DECODING IN COMMUNICATIONS DEVICES

(75) Inventors: Divaydeep Sikri, Farnborough (GB); Hassan Rafique, Farnborough (GB); Mukund Agarwal, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/605,380

(22) Filed: Sep. 6, 2012

(65) Prior Publication Data

US 2014/0064161 A1    Mar. 6, 2014

(51) Int. Cl.
G08C 17/00    (2006.01)
H04W 4/00    (2009.01)

(52) U.S. Cl.
USPC .......................................... 370/311; 370/328

(58) Field of Classification Search
CPC . H04W 52/02; H04W 52/0216; H04W 80/04; H04W 88/06
USPC ................................................ 370/311, 328
See application file for complete search history.

(56) References Cited

U.S. PATENT DOCUMENTS

| 7,107,013 | B2 | 9/2006 | Qiu |
| 7,342,956 | B2 | 3/2008 | Chang et al. |
| 7,869,357 | B2* | 1/2011 | Kim et al. ............... 370/230 |
| 2002/0064140 | A1* | 5/2002 | Numminen ............ 370/311 |
| 2004/0225707 | A1* | 11/2004 | Chong et al. ........... 709/200 |
| 2005/0226204 | A1* | 10/2005 | Uehara .................. 370/349 |
| 2006/0135080 | A1* | 6/2006 | Khandekar et al. ..... 455/69 |
| 2007/0058736 | A1* | 3/2007 | Nguyen et al. ......... 375/260 |
| 2008/0010582 | A1* | 1/2008 | Nieto et al. ............ 714/790 |
| 2008/0186890 | A1 | 8/2008 | Shao et al. |
| 2009/0019339 | A1 | 1/2009 | Wandel |
| 2009/0052378 | A1* | 2/2009 | Aghili et al. ........... 370/328 |
| 2009/0135773 | A1* | 5/2009 | Aghili et al. ........... 370/329 |
| 2009/0312073 | A1 | 12/2009 | Park et al. |
| 2010/0034319 | A1 | 2/2010 | Ludvigsen et al. |
| 2011/0090844 | A1* | 4/2011 | Gong et al. ............ 370/328 |

FOREIGN PATENT DOCUMENTS

WO    WO-2011104371 A1    9/2011

OTHER PUBLICATIONS

International Search Report and Written Opinion—PCT/US2013/057653—ISA/EPO—Dec. 5, 2013.

* cited by examiner

Primary Examiner — Ronald Abelson (57) ABSTRACT

Communications devices are adapted to receive a plurality of RF bursts of a radio block, where the plurality of RF bursts includes a number of RF bursts less than a total number of RF bursts for the radio block. A header can be decoded from the received plurality of RF burst. From the decoded header, a determination may be made whether the radio block is intended for the communications device or for another device. According to at least some examples, if the radio block is determined to be intended for another device, at least a portion of a receiver circuit of the communications device can be powered down. Also, according to at least some examples, if the radio block is determined to be intended for the receiving communications device, a data payload of the radio block may be decoded. Other aspects, embodiments, and features are also claimed and described.

30 Claims, 6 Drawing Sheets

| Burst 1 | 0 | 42 | 59 | 76 | 18 | 35 | 52 | 94 | 11 | 28 | 70 | 87 | 4 | 46 | 63 | 80 | ... |
| Burst 2 | 25 | 67 | 84 | 1 | 43 | 60 | 77 | 19 | 36 | 53 | 95 | 12 | 29 | 71 | 88 | 5 | ... |
| Burst 3 | 50 | 92 | 9 | 26 | 68 | 85 | 2 | 44 | 61 | 78 | 20 | 37 | 54 | 96 | 13 | 30 | ... |
| Burst 4 | 75 | 17 | 34 | 51 | 93 | 10 | 27 | 69 | 86 | 3 | 45 | 62 | 79 | 21 | 38 | 55 | ... |

METHODS AND DEVICES FOR FACILITATING EARLY HEADER DECODING IN COMMUNICATIONS DEVICES

TECHNICAL FIELD

The following relates generally to wireless communication, and more specifically to methods and devices for facilitating power conservation through early header decoding of digital communications.

BACKGROUND

Within a typical digital communications system, information is represented as a sequence of binary bits (e.g., ones and zeros). To transmit the information, the binary bits are modulated onto an analog signal waveform, and transmitted over a communications channel. The communications channel may introduce noise and interference that can corrupt the transmitted signal. At the receiver, the corrupted received signal is mapped back into the digital domain, although bit errors may result due to the introduced noise and interference.

To compensate for bit errors, channel coding is often used in digital communications systems to allow for error detection and correction to occur. Channel coding is often accomplished by selectively introducing redundant bits into the transmitted bit stream. These redundant bits allow detection and correction of bit errors in a received bit stream.

One type of channel coding employed in wireless communications systems includes convolutional coding. Convolutional coding schemes are one of the most widely used channel coding schemes in wireless communications systems. The ratio between the number of input bits and the number of output bits is called the code rate. For instance, a convolutional coder which calculates two output bits for each input bit is typically referred to as a half-rate convolutional coder. Similarly, a convolutional coder which calculates three output bits for each input bit is typically referred to as a one-third-rate convolutional coder.

BRIEF SUMMARY OF SOME EXAMPLES

In some instances, a receiver may be a device powered by a limited power source, such as a rechargeable battery. Accordingly, features employed in a digital communications system for reducing the power consumed by a receiver can be beneficial. Various features and aspects of the present disclosure are adapted to facilitate power conservation in a communications device when receiving transmissions in a digital communications system. According to at least one aspect of the present disclosure, access terminals are adapted to decode a header of a digital communication before receiving all the RF bursts associated with the communication. According to one or more examples, such access terminals may include a storage medium and a communications interface with a receiver circuit. The storage medium and the communications interface are coupled to a processing circuit. The processing circuit is adapted to receive a plurality of RF bursts of a radio block via the receiver circuit of the communications interface. The plurality of RF bursts includes a number of RF bursts less than a total number of RF bursts for the radio block. From the plurality of received RF bursts, the processing circuit can decode at least a portion of a header. From information included in the decoded header, the processing circuit can determine whether the radio block is intended for the wireless communication device. If the decoded header indicates the radio block is not intended for the wireless communication device, the processing circuit can be adapted to power down at least a portion of the receiver circuit.

Further aspects provide methods operational on an access terminals and/or access terminals including means to perform such methods. One or more examples of such methods may include receiving a plurality of RF bursts of a radio block, where the plurality of RF bursts includes a number of RF bursts less than a total number of RF bursts for the radio block. A header, or at least a portion thereof, can be decoded from the received plurality of RF bursts. In response to the decoded header indicating the radio block is not intended for the wireless communication device, a receiver circuit, or a portion thereof, can be powered down.

Still further aspects include computer-readable mediums comprising programming operational on an access terminal. According to one or more examples, such programming may be adapted for receiving a plurality of RF bursts of a radio block, where the number of RF bursts received is less than the total number of RF bursts for the radio block. The programming may further be adapted to decode a header from the received plurality of RF bursts, and determine from the decoded header whether the radio block is intended for the wireless communication device. When the decoded header indicates the radio block is not intended for the wireless communication device, the programming may be adapted to power down at least a portion of a receiver circuit.

Other aspects, embodiments, and features within the scope of the present disclosure will become apparent to those of ordinary skill in the art upon reviewing the following detailed description.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the disclosure are described below for GSM and EGPRS systems, and related terminology may be found in much of the following description. However, those of ordinary skill in the art will recognize that one or more aspects of the present disclosure may be employed and included in one or more other wireless communication protocols and systems.

Figure 1:
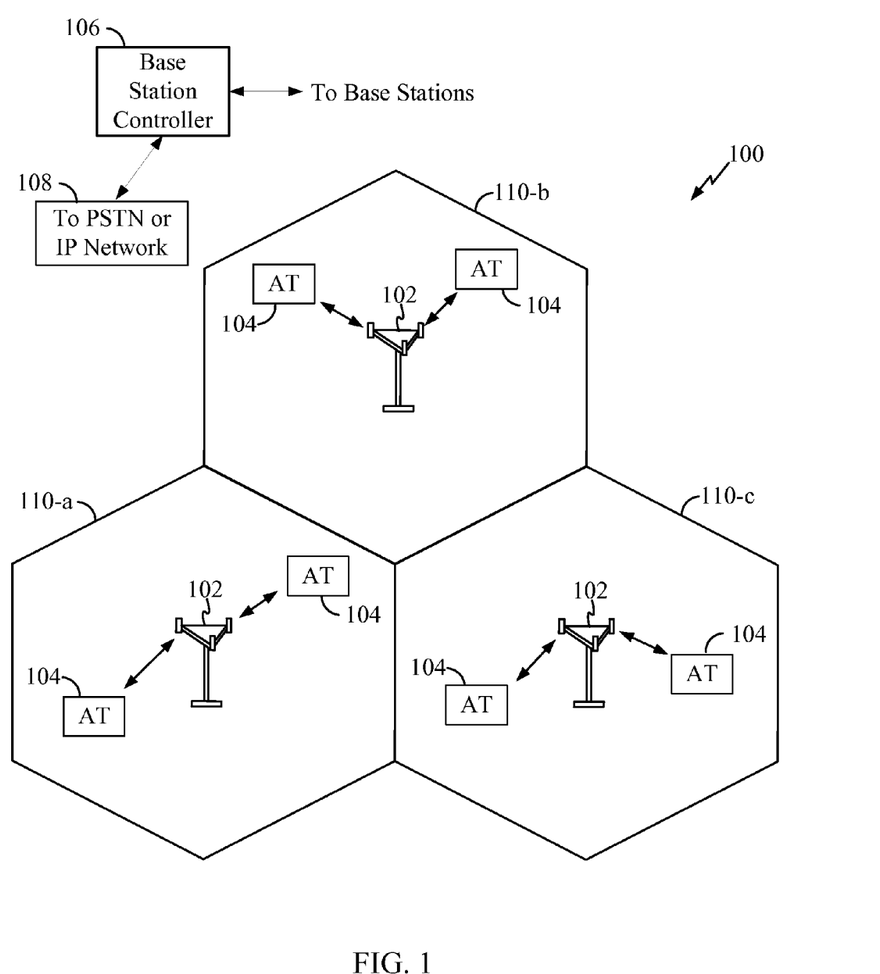
FIG. 1 is a block diagram illustrating an example of a network environment in which one or more aspects of the present disclosure may find application.

FIG. 1 is a block diagram illustrating at least one example of a network environment in which one or more aspects of the present disclosure may find application. The wireless communication system 100 is adapted to facilitate wireless communication between a plurality of wireless communication devices, including base stations 102 and access terminals 104. The wireless communication system 100 can further include one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)).

The wireless communication devices (e.g., the base stations 102 and access terminals 104) may be adapted to interact with one another through wireless signals. In some instances, such wireless interaction may occur on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 may wirelessly communicate with the access terminals 104 via a base station antenna. The base stations 102 may each include a device that facilitates wireless connectivity (for one or more access terminals 104) to a communications network. The base stations 102 may also be referred to by those of ordinary skill in the art as access points, base transceiver stations (BTS), radio base stations, radio transceivers, transceiver functions, basic service sets (BSS), extended service sets (ESS), Node Bs, femto cells, pico cells, and/or some other suitable terminology.

The base stations 102 are configured to communicate with the access terminals 104 under the control of the base station controller 106. Each of the base stations 102 can provide communication coverage for a respective geographic coverage area 110. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

The access terminals 104 may be dispersed throughout the coverage areas 110, and may wirelessly communicate with one or more sectors associated with each respective base station 102. An access terminal 104 may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, a user equipment (UE), a mobile terminal, a wireless terminal, a remote terminal, a handset, a terminal, a user agent, a mobile client, a client, a machine-to-machine device, or some other suitable terminology. Some non-limiting examples of access terminals 104 include mobile phones, pagers, wireless modems, personal digital assistants (PDAs), personal information managers (PIMs), personal media players, palmtop computers, laptop computers, tablet computers, televisions, appliances, e-readers, digital video recorders (DVRs), and/or other communication/computing devices which communicate, at least partially, through a wireless or cellular network.

Figure 2:
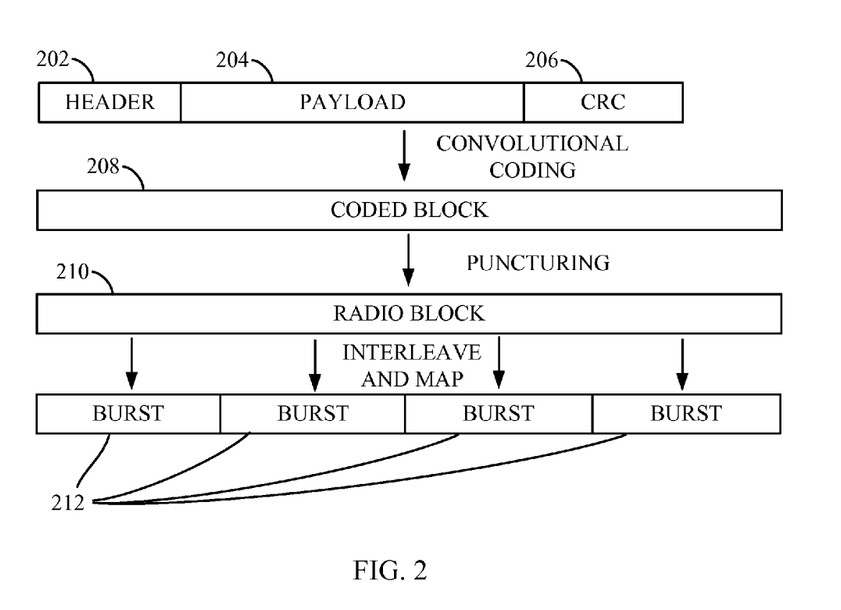
FIG. 2 is a block diagram illustrating at least some of the stages associated with transmitting data from a wireless communications device in accordance with at least one example.

The wireless communications devices (e.g., base stations 102 and access terminals 104) may wirelessly communicate information by transmitting and receiving binary bits over an air interface from one device to another. FIG. 2 depicts at least some of the stages associated with transmitting data from a wireless communications device in accordance with at least one example. A data block is formed including a data block header 202 (e.g., header information bits), a payload 204 (e.g., data information bits), and additional information bits 206 such as a cyclic redundancy check (CRC), checksum, or tail bits. This data block can be convolutionally coded to generate what is identified in FIG. 2 as the coded block 208. Convolutional encoding can provide redundancy for error correction to compensate for bit errors caused by noise and interference over the air interface. Some redundant bits generated by convolutional encoding may be punctured prior to transmission, resulting in what is depicted as the radio block 210 in FIG. 2. Puncturing increases the rate of the convolutional code and reduces the redundancy per data block transmitted. Puncturing additionally lowers the bandwidth requirements such that the convolutionally encoded signal fits into the available channel bit stream. When no puncturing is employed, the coded block 208 and the radio block 210 may be at least substantially the same.

The convolutionally encoded (and optionally punctured) bits (e.g., the radio block 210) can be interleaved to change the bit order according to a specified pattern. Interleaving reduces the chance that several consecutive bits are changed during transmission, which may result in a receiving device being unable to correctly reconstruct the originally sent data block from the received transmissions. The reordered and encoded bits are mapped to a plurality of RF bursts 210 (typically four RF bursts), with each RF burst 212 being transmitted individually until all four RF bursts 212 of a radio block 210 are transmitted.

Figure 3:
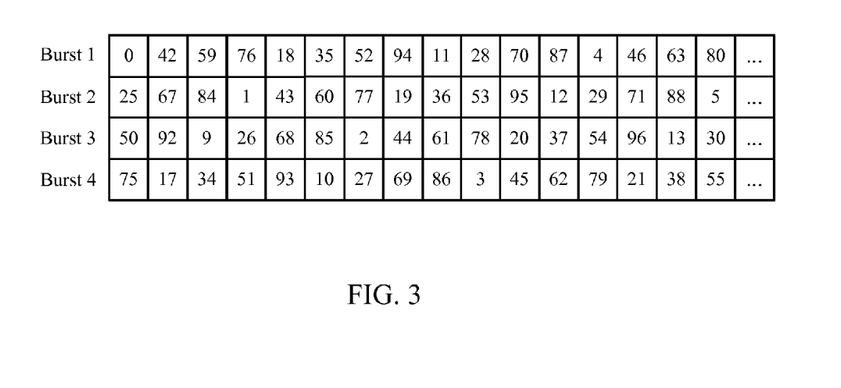
FIG. 3 is a block diagram illustrating some encoded bits of a radio block interleaved and mapped to a plurality of RF bursts according to at least one example.

The transmitting device may employ one of a plurality of different modulation and coding schemes, which include patterns for interleaving and mapping the coded bits to the plurality of RF bursts. FIG. 3 shows an example of interleaving and mapping to four RF bursts each coded bit 1 through 'N' of the convolutionally encoded bit stream according to the modulation and coding schemes referred to as MCS 5 or MCS 6 in a GSM (e.g., EGPRS) capable wireless communication system. Of the plurality of coded bits in the radio block, 100 bits (typically coded bits 0 through 99) represent coded header bits. These 100 coded header bits are generated from one-third-rate convolutionally encoding an original 33 header information bits so that there are three coded header bits associated with each original header information bit, with the addition of one extra bit. Each of the four RF bursts (e.g., burst 1, burst 2, burst 3 and burst 4 in FIG. 2) carries 25 of the 100 coded header bits. The first two RF bursts (e.g., burst 1 and burst 2) carry at least one coded header bit associated with each original header information bit except one. In other words, the first two RF bursts carry coded header bits for 32 of the 33 original header information bits. The first three RF bursts (e.g., burst 1, burst 2 and burst 3) carry at least one coded header bit for all 33 original header information bits.

In other examples where one of the modulation and coding schemes referred to as MCS 7, MCS 8, or MCS 9 is employed, there may be 45 header information bits prior to convolutional coding. These 45 header information bits may be one-third-rate convolutionally encoded so that there are three coded header bits associated with each original header information bit, resulting in 135 coded header bits. In these examples, 11 of the coded header bits may be punctured, so that only 124 coded header bits are mapped to, and transmitted on four RF bursts (typically coded bits 0 through 123). Each of the four RF bursts carries 31 of the 124 coded header bits. For MCS 7, MCS 8, and MCS 9, the first two RF bursts carry at least one coded header data bit associated with 35 of the 45 original header information bits. That is, the first two RF bursts do not include any coded header bits for 10 of the 45 original header information bits. The first three RF bursts, however, carry information for 44 of the 45 original header information bits.

Referring to FIGS. 1 and 2, when a base station 102 transmits a radio block 210, the four RF bursts 212 may be received by a plurality of access terminals 104. All of the receiving access terminals 104 typically receive all four RF bursts 212, de-interleave, de-puncture (if needed), and then decode the coded block 208 to obtain the original data block. From the decoded data block, each access terminal 104 typically determines from the header information 202 whether the data block is intended for it or for another access terminal 104. For example, in a GPRS wireless communication system, the header information bits 202 may include a temporary flow identifier (TFI) adapted to identify the access terminal 104 to which the data block is addressed. If an access terminal 104 determines from the temporary flow identifier (TFI) that the data block is intended for it, then the access terminal 104 can process the data block decoded from the four received RF bursts 212. If, on the other hand, the access terminal 104 determines from the temporary flow identifier (TFI) that the data block is not intended for it, then the access terminal 104 can ignore the received data block. Conventionally, however, the access terminal 104 stays powered ON to receive all the RF bursts 212 of the radio block before determining whether the block is even addressed to it or to another access terminal 104.

The reception and processing of data blocks that end up being addressed to another access terminal 104 carries a cost in power consumption. As noted above, for MCS-5 and MCS-6, the first two RF bursts 212 carry coded header bits for 32 of the 33 original header information bits 202, while the first three RF bursts 212 carry coded header bits for all 33 original header information bits 202. Furthermore, the first two RF bursts 212 in MCS-7, MCS-8 and MCS-9 carry coded header bits for 35 of the 45 original header information bits 202, while the first three RF bursts 212 carry coded header bits for 44 of the 45 original header information bits 202. As a result, in accordance with an aspect of the present disclosure, the header may be decoded on receipt of just two or three RF bursts 212.

According to an aspect of the present disclosure, communications devices (e.g., access terminals 104) are adapted to determine the header information after receiving fewer than all the RF bursts 212 for a given radio block 210. For example, an access terminal 104 may receive two or three of the four RF bursts 212. Prior to receiving the remaining RF bursts 212, the access terminal 104 may determine whether the information within the header 202 (e.g., a temporary flow identifier (TFI)) indicates that the radio block 210 is intended for the access terminal 104. If the header information 202 indicates that the radio block 210 is intended for the access terminal 104, the radio block 210 may be decoded either from a number of RF bursts 212 less than the total number of RF bursts 212 for the radio block 210, or from the total number of RF bursts 212 after receiving the remaining RF bursts 212 for the radio block 210. If the header information 202 indicates that the radio block 210 is not intended for the access terminal 104, the access terminal 104 may skip reception of the remaining RF bursts 202 to conserve power.

Figure 4:
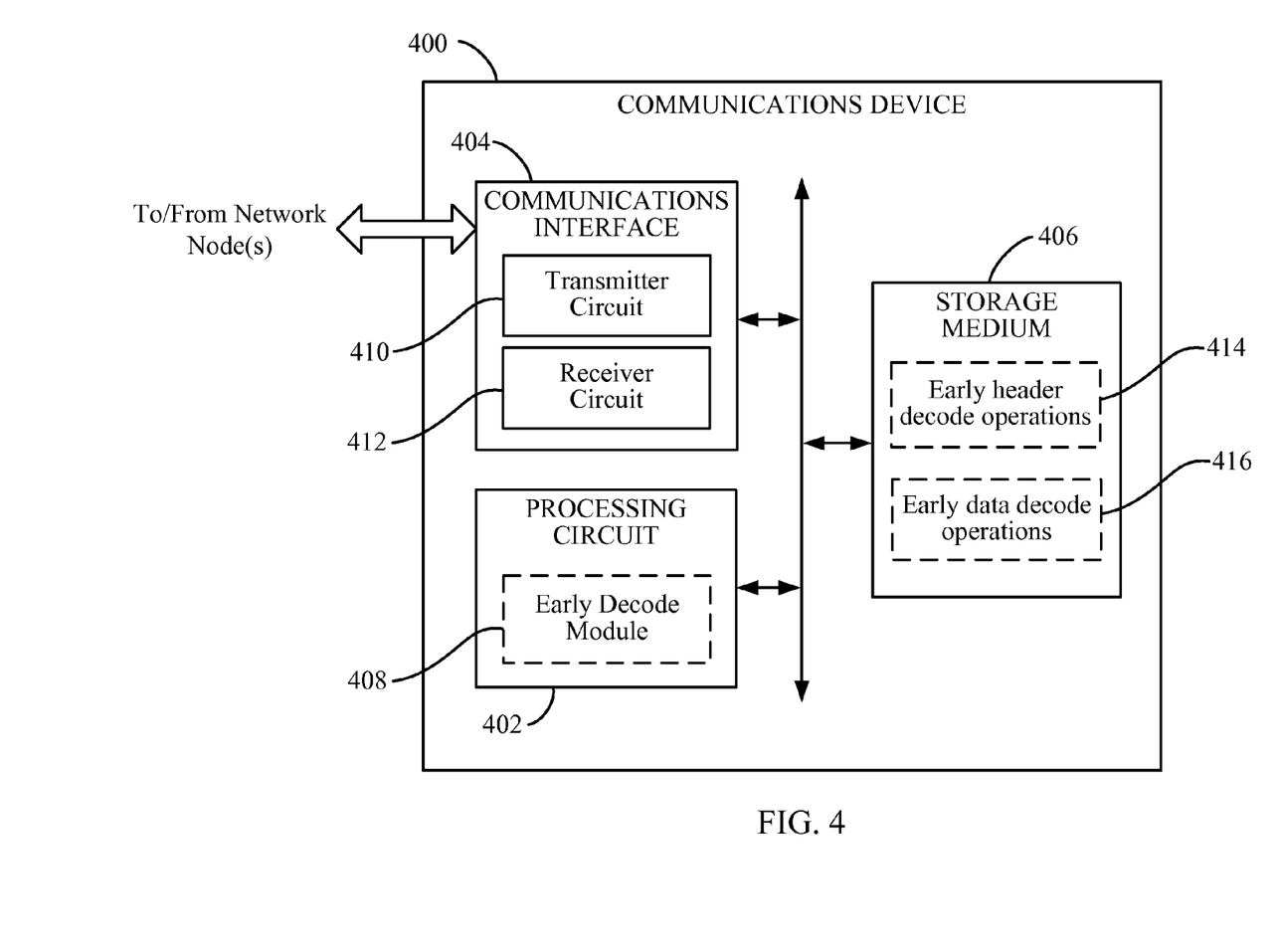
FIG. 4 is a block diagram illustrating select components of an access terminal according to at least one example.

FIG. 4 is a block diagram illustrating select components of a communications device 400 according to at least one example of the present disclosure. Such a communications device 400 may be implemented, for example as one or more of the wireless communications devices described above with reference to FIG. 1. The communications device 400 may include a processing circuit 402 coupled to or placed in electrical communication with a communications interface 404 and a storage medium 406.

The processing circuit 402 is arranged to obtain, process and/or send data, control data access and storage, issue commands, and control other desired operations. The processing circuit 402 may include circuitry configured to implement desired programming provided by appropriate media in at least one example. For example, the processing circuit 402 may be implemented as one or more processors, one or more controllers, and/or other structure configured to execute executable programming. Examples of the processing circuit 402 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 402 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 402 are for illustration and other suitable configurations within the scope of the present disclosure are also contemplated.

The processing circuit 402 is adapted for processing, including the execution of programming, which may be stored on the storage medium 406. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 402 may include an early decode module 408. The early decode module 408 may include circuitry and/or programming (e.g., programming stored on the storage medium 406) adapted to, among other things, decode a header from a number of received RF bursts fewer than all the RF bursts of a radio block, determine whether the header indicates the radio block is intended for the communications device 400, stop reception when the radio block is not intended for the communications device 400, and/or decode the radio block when it is intended for the communications device 400. In at least some examples, the early decode module 408 may be at least partially implemented by a decoder, such as a Viterbi decoder, adapted to decode an encoded bit stream received by the communications device 400.

The communications interface 404 is configured to facilitate wireless communications of the communications device 400. For example, the communications interface 404 may include circuitry and/or programming adapted to facilitate the communication of information bi-directionally with respect to one or more network nodes. The communications interface 404 may be coupled to one or more antennas (not shown), and includes wireless transceiver circuitry, including at least one transmitter circuit 410 (e.g., one or more transmitter chains) and/or at least one receiver circuit 412 (e.g., one or more receiver chains). By way of example and not limitation, the at least one receiver circuit 412 may include circuitry, devices and/or programming adapted to receive, demodulate and process wireless transmissions to recover information included in the wireless transmissions.

The storage medium 406 may represent one or more computer-readable, machine-readable, and/or processor-readable devices for storing programming, such as processor executable code or instructions (e.g., software, firmware), electronic data, databases, or other digital information. The storage medium 406 may also be used for storing data that is manipulated by the processing circuit 402 when executing programming. The storage medium 406 may be any available media that can be accessed by a general purpose or special purpose processor, including portable or fixed storage devices, optical storage devices, and various other mediums capable of storing, containing or carrying programming. By way of example and not limitation, the storage medium 406 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 406 may be coupled to the processing circuit 402 such that the processing circuit 402 can read information from, and write information to, the storage medium 406. That is, the storage medium 406 can be coupled to the processing circuit 402 so that the storage medium 406 is at least accessible by the processing circuit 402, including examples where the storage medium 406 is integral to the processing circuit 402 and/or examples where the storage medium 406 is separate from the processing circuit 402 (e.g., resident in the communications device 400, external to the communications device 400, distributed across multiple entities).

Programming stored by the storage medium 406, when executed by the processing circuit 402, causes the processing circuit 402 to perform one or more of the various functions and/or process steps described herein. For example, the storage medium 406 may include early header decode operations (or instructions) 414 and/or early data decode operations (or instructions) 416. The early header decode operations 414 and the early data decode operations 416 can be implemented by the processing circuit 402 in, for example, the early decode module 408 to decode header bits prior to receiving all the RF bursts of a radio block, determine whether the radio block is intended for the communications device 400, stop reception of any remaining RF bursts when the radio block is not intended for the communications device 400, and/or decode the radio block when it is intended for the communications device 400. Thus, according to one or more aspects of the present disclosure, the processing circuit 402 may be adapted to perform (in conjunction with the storage medium 406) any or all of the processes, functions, steps and/or routines for any or all of the access terminals described herein (e.g., access terminal 104 or 400). As used herein, the term "adapted" in relation to the processing circuit 402 may refer to the processing circuit 402 being one or more of configured, employed, implemented, or programmed to perform a particular process, function, step and/or routine according to various features described herein.

Figure 5:
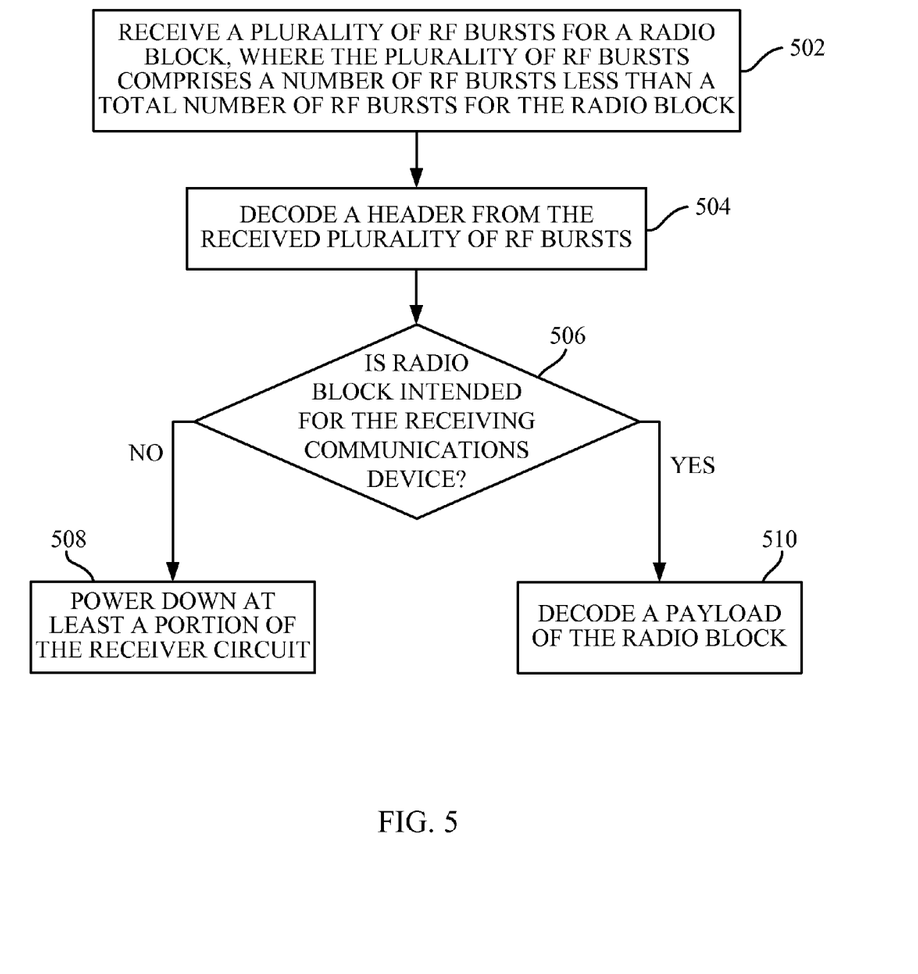
FIG. 5 is a flow diagram illustrating an example of a method operational on an access terminal according to at least one example.

In operation, the communications device 400 is adapted to power down one or more components associated with the receiver circuit 412 prior to receiving all the RF bursts for a data block in various situations. FIG. 5 is a flow diagram showing at least one example of a method operational on a communications device, such as the communications device 400. With reference to FIGS. 4 and 5, a communications device 400 can receive a plurality of RF bursts for a radio block at step 502. The plurality of received RF bursts includes a number of RF bursts less than a total number of RF bursts for the radio block. For example, if the radio block includes a total of four RF bursts, the number of RF bursts received at step 502 may be two RF bursts or three RF bursts. In at least one example, the processing circuit 402 may receive the plurality of RF bursts via the receiver circuit 412 of the communications interface.

On receipt of the plurality of RF bursts, the communications device 400 may decode at least a portion of a header from the received plurality of RF bursts at step 504. For example, from the plurality of RF bursts, the processing circuit 402 (e.g., the early decode module 408) executing the early header decode operations 414 can decode at least a portion of the header for the received radio block. That is, the received RF bursts may be de-interleaved by the processing circuit 402 (e.g., the early decode module 408) executing the early header decode operations 414, and the encoded and de-interleaved header bits can be at least partially decoded. In at least some examples, the encoded header bits can be decoded by the processing circuit 402 (e.g., the early decode module 408) executing the early header decode operations 414 employing a conventional Viterbi decoding algorithm, where the encoded header bits included in the missing RF bursts (e.g., the RF bursts that have not yet been received) can be treated as missing.

At decision diamond 506, the communications device 400 determines whether the radio block associated with the received RF bursts is intended for the communications device 400. For example, the processing circuit 402 (e.g., the early decode module 408) executing the early header decode operations 414 may locate an identifier included in the decoded header, such as a temporary flow identifier (TFI), adapted to indicate the communications device to which the radio block is addressed.

If the identifier indicates that the radio block is not intended for the communications device 400, the communications device 400 can, at step 508, power down at least a portion of the receiver circuit 412. For example, the processing circuit 402 (e.g., the early decode module 408) executing the early header decode operations 414 may power down (e.g., reduce the power to and/or power OFF) one or more components and/or circuits associated with the receiver circuit 412. As a result of powering down at least a portion of the receiver circuit 412, the communications device 400 will skip reception of any remaining RF bursts for the radio block.

On the other hand, when the identifier indicates that the radio block is intended for the communications device 400, then the communications device 400 can decode a data payload of the radio block at step 510. For example, the processing circuit 402 (e.g., the early decode module 408) may decode the data payload of the radio block. In some instances, the processing circuit 402 (e.g., the early decode module 408) executing the early data decode operations 416 may decode the payload of the radio block before receiving all of the RF bursts associated with the radio block. In other instances, the processing circuit 402 may first receive all RF bursts associated with the radio block before decoding the data payload of the radio block.

Figure 6:
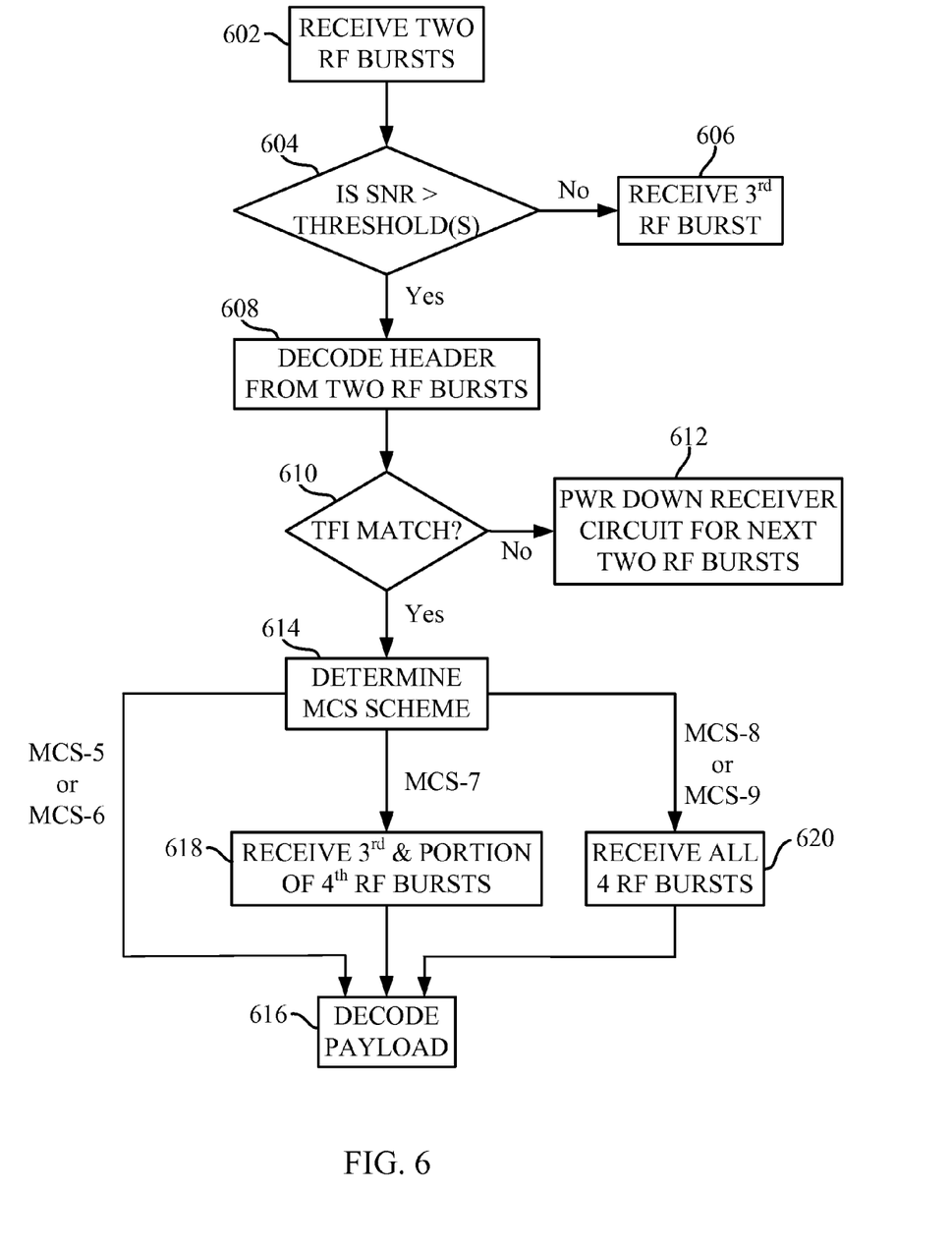
FIG. 6 is a flow diagram illustrating an example of a method operational on a communications device when two RF bursts are received for a radio block having four total RF bursts.

In some instances, one or more aspects of at least some of the steps of the method described with reference to FIG. 5 may depend on the number of RF bursts received by the communications device 400. For instance, in some examples each radio block includes four RF bursts and various aspects of the method of FIG. 5 may be employed when two or three RF bursts are received. FIG. 6 is a flow diagram illustrating an example of a method operational on a communications device, such as the communications device 400 of FIG. 4, when two RF bursts are received for a radio block having four total RF bursts. With reference to FIGS. 4 and 6, two RF bursts are received at step 602. For instance, the processing circuit 402 may receive two RF bursts via the receiver circuit 412 of the communications interface 404. The reception of the two RF bursts at step 602 may correspond to step 502 described above with reference to FIG. 5.

At decision diamond 604, the communications device 400 determines whether a signal-to-noise ratio is above one or more thresholds. For example, the processing circuit 402 (e.g., the early decode module 408) executing the early header decode operations 414 may determine an average signal-to-noise ratio associated with the received RF bursts of the radio block. In at least some instances, a determination may be made whether the average signal-to-noise ratio is above some predetermined threshold for decoding a stealing flag and/or the header. In EGPRS communications, the stealing flag is adapted to identify the type of header that was used by the transmitter. There is generally a common header for the modulation and coding schemes MCS-1, MCS-2, MCS-3 and MCS-4, another common header for MCS-5 and MCS-6, and another common header for MCS-7, MCS-8 and MCS-9. If the average signal-to-noise ratio is not above a predetermined threshold for decoding the stealing flag and/or the header, the processing circuit 402 (e.g., the early decode module 408) executing the early header decode operations 414 may receive the third RF burst at step 606 via the receiver circuit 412, and may follow at least a portion of the method described below with reference to FIG. 7.

If the average signal-to-noise ratio is above a predetermined threshold for decoding the stealing flag, the processing circuit 402 can decode the stealing flag and determine which modulation and coding scheme has been employed. With knowledge of the particular modulation and coding scheme, the processing circuit 402 (e.g., the early decode module 408) executing the early header decode operations 414 can further determine whether the average signal-to-noise ratio is above some predetermined threshold for decoding the header associated with the identified modulation and coding scheme. If the average signal-to-noise ratio is above the thresholds for decoding the stealing flag and for decoding the header associated with particular modulation and coding scheme, the communications device 400 can decode the header from the two RF bursts at step 608. As noted above, the processing circuit 402 (e.g., the early decode module 408) executing the early header decode operations 414 may decode the header from the two RF bursts by employing a conventional Viterbi decoding algorithm, where the encoded header bits included in the missing RF bursts (e.g., the RF bursts that have not yet been received) can be treated as missing.

With the header decoded, the communications device 400 can determine at decision diamond 610 whether the temporary flow identifier (TFI) included in the header of EGPRS communications matches a temporary flow identifier (TFI) associated with the communications device 400. For example, the processing circuit 402 (e.g., the early decode module 408) executing the early header decode operations 414 can compare the temporary flow identifier (TFI) from the decoded header with the temporary flow identifier (TFI) assigned to the communications device 400, which may be stored in the storage medium 406. If the temporary flow identifier (TFI) does not match, the communications device 400 can power down at least a portion of the receiver circuit 412 at step 612, as discussed above with reference to step 508 in FIG. 5, and can skip the last two RF bursts.

If the temporary flow identifier (TFI) does match the temporary flow identifier (TFI) associated with the communications device 400, then the processing circuit 402 (e.g., the early decode module 408) executing the early data decode operations 416 can determine which modulation and coding scheme (MCS) has been employed at step 614. This operation may be performed by the processing circuit 402 employing the decoded stealing flag and/or the decoded header to determine which modulation and coding scheme (MCS) was employed by the transmitting device.

According to an aspect of the example illustrated in FIG. 6, when the communications device 400 determines the modulation and coding scheme (MCS) to be either MCS-5 or MCS-6, the payload may be decoded without receiving any further RF bursts at step 616. In some instances, the processing circuit 402 may determine whether the signal quality is sufficiently good to support decoding the data payload from only the first two RF bursts. For instance, the processing circuit 402 may determine whether the average signal-to-noise ratio is above some predetermined threshold. If the signal quality is sufficient, the processing circuit 402 (e.g., the early decode module 408) executing the early data decode operations 416 may employ the two received RF bursts in decoding the data payload of the radio block using a conventional decoding algorithm, such as a Viterbi decoding algorithm, where the coded bits associated with the third and fourth RF bursts are treated as missing. If the data payload is successfully decoded from the two RF bursts, the processing circuit 402 can power down the receiver circuit 412 and can skip receiving the remaining two RF bursts for the radio block.

If the communications device 400 determines the modulation and coding scheme (MCS) to be MCS-7, then the processing circuit 402 (e.g., the early decode module 408) executing the early data decode operations 416 can receive the third RF burst as well as a portion of the fourth RF burst at step 618. For example, the processing circuit 402 may receive via the receiver circuit 412 of the communications interface 404 the third RF burst and the first half of the fourth RF burst. After receiving the third RF burst and at least the first half of the fourth RF burst, the communications device 400 can decode the data payload at step 616.

If the communications device 400 determines the modulation and coding scheme (MCS) to be MCS-8 or MCS-9, the processing circuit 402 can receive the two remaining RF bursts (the third and fourth RF bursts) at step 620. After receiving all four of the RF bursts, the communications device 400 can decode the data payload at step 616 according to conventional decoding methods.

Figure 7:
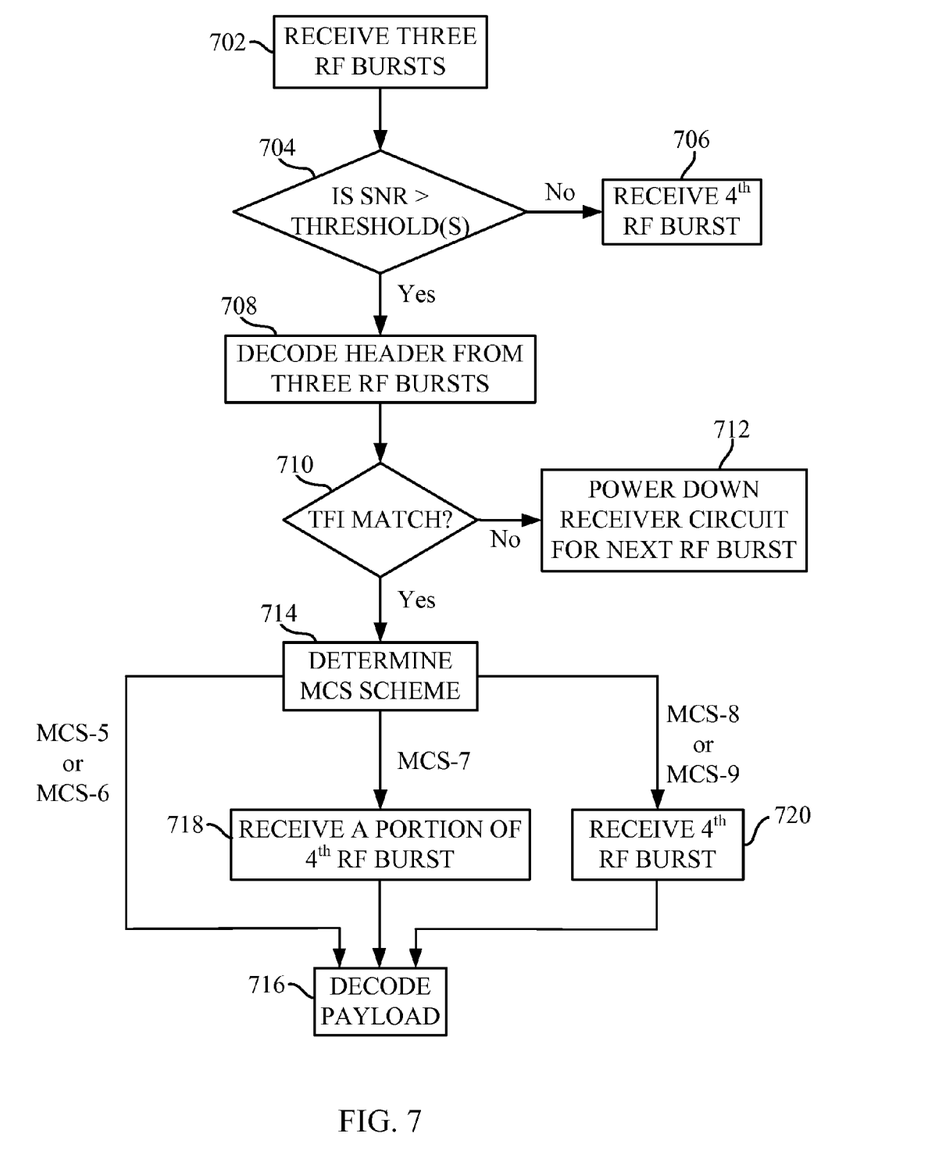
FIG. 7 is a flow diagram illustrating an example of a method operational on a communications device when three RF bursts are received for a radio block having four total RF bursts.

FIG. 7 is a flow diagram illustrating an example of a method operational on a communications device, such as the communications device 400 of FIG. 4, when three RF bursts are received for a radio block having four total RF bursts. With reference to FIGS. 4 and 7, three RF bursts are received at step 702. For instance, the processing circuit 402 may receive three RF bursts via the receiver circuit 412 of the communications interface 404. The reception of the three RF bursts at step 702 may correspond to step 502 described above with reference to FIG. 5.

At decision diamond 704, the communications device 400 determines whether a signal-to-noise ratio is above one or more thresholds. For example, the processing circuit 402 (e.g., the early decode module 408) executing the early header decode operations 414 may determine an average signal-to-noise ratio associated with the received RF bursts of the radio block. In at least some instances, a determination may be made whether the average signal-to-noise ratio is above some predetermined threshold for decoding a stealing flag and/or the header. If the average signal-to-noise ratio is not above a predetermined threshold for decoding the stealing flag and/or the header, the processing circuit 402 (e.g., the early decode module 408) executing the early header decode operations 414 may receive the fourth RF burst at step 706 via the receiver circuit 412, and can process the four RF bursts according to conventional decoding and processing.

If the average signal-to-noise ratio is above a predetermined threshold for decoding the stealing flag, the processing circuit 402 can decode the stealing flag and determine which modulation and coding scheme has been employed. With knowledge of the particular modulation and coding scheme, the processing circuit 402 (e.g., the early decode module 408) executing the early header decode operations 414 can further determine whether the average signal-to-noise ratio is above some predetermined threshold for decoding the header associated with the identified modulation and coding scheme. If the average signal-to-noise ratio is above the thresholds for decoding the stealing flag and for decoding the header associated with particular modulation and coding scheme, the communications device 400 can decode the header from the three RF bursts at step 708. As noted above, the processing circuit 402 (e.g., the early decode module 408) executing the early header decode operations 414 may decode the header from the three RF bursts by employing a conventional Viterbi decoding algorithm, where the encoded header bits included in the missing RF burst (e.g., the fourth RF burst that has not yet been received) can be treated as missing.

With the header decoded, the communications device 400 can determine at decision diamond 710 whether the temporary flow identifier (TFI) included in the header of the EGPRS communication matches a temporary flow identifier (TFI) associated with the communications device 400. For example, the processing circuit 402 (e.g., the early decode module 408) executing the early header decode operations 414 can compare the temporary flow identifier (TFI) from the decoded header with the temporary flow identifier (TFI) assigned to the communications device 400, which may be stored in the storage medium 406. If the temporary flow identifier (TFI) does not match, the communications device 400 can power down at least a portion of the receiver circuit 412 at step 712, as discussed above with reference to step 508 in FIG. 5 and can skip the last RF burst.

If the temporary flow identifier (TFI) does match the temporary flow identifier (TFI) associated with the communications device 400, then the processing circuit 402 (e.g., the early decode module 408) executing the early data decode operations 416 can determine which modulation and coding scheme (MCS) has been employed at step 714. This operation may be performed by the processing circuit 402 employing the decoded stealing flag and/or the decoded header to determine which modulation and coding scheme (MCS) was employed by the transmitting device.

When the communications device 400 determines the modulation and coding scheme (MCS) to be either MCS-5 or MCS-6, the data payload of the received radio block may be decoded without receiving the last RF burst at step 716. In some instances, the processing circuit 402 may determine whether the signal quality is sufficiently good to support decoding the data payload from only the first three RF bursts. For instance, the processing circuit 402 may determine whether the average signal-to-noise ratio is above some predetermined threshold. If the signal quality is sufficient, the processing circuit 402 (e.g., the early decode module 408) executing the early data decode operations 416 may employ the three received RF bursts in decoding the data payload of the radio block using a conventional decoding algorithm, such as a Viterbi decoding algorithm, where the coded bits associated with the fourth RF burst are treated as missing. If the data payload is successfully decoded from the three RF bursts, the processing circuit 402 can power down the receiver circuit 412 and can skip receiving the last RF burst for the radio block.

If the communications device 400 determines the modulation and coding scheme (MCS) to be MCS-7, then the processing circuit 402 (e.g., the early decode module 408) executing the early data decode operations 416 can receive the a portion of the fourth RF burst at step 718. For example, the processing circuit 402 may receive via the receiver circuit 412 of the communications interface 404 at least the first half of the fourth RF burst. After receiving the at least the first half of the fourth RF burst, the communications device 400 can decode the data payload at step 716.

If the communications device 400 determines the modulation and coding scheme (MCS) to be MCS-8 or MCS-9, the processing circuit 402 can receive the fourth RF burst at step 720. After receiving all four of the RF bursts, the communications device 400 can decode the data payload at step 716 according to conventional decoding methods.

While the above discussed aspects, arrangements, and embodiments are discussed with specific details and particularity, one or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1 and/or 4 may be configured to perform or employ one or more of the methods, features, parameters, or steps described in FIGS. 2, 3, 5, 6 and/or 7. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
   a communications interface including a receiver circuit;
   a storage medium; and
   a processing circuit coupled to the communications interface and the storage medium, the processing circuit adapted to:
   receive via the receiver circuit a plurality of RF bursts of an interleaved radio block, wherein the plurality of RF bursts includes a number of RF bursts less than a total number of RF bursts for the radio block, and wherein the plurality of RF bursts of the interleaved radio block comprise coded header bits and coded payload bits interleaved together;
   decode at least a portion of a header from the received plurality of RF bursts;
   determine from the decoded header whether the radio block is intended for the wireless communication device; and
   power down at least a portion of the receiver circuit when the decoded header indicates the radio block is not intended for the wireless communication device.

2. The wireless communication device of claim 1, wherein the processing circuit is further adapted to:
   decode a payload of the radio block when the decoded header indicates the radio block is intended for the wireless communication device.

3. The wireless communication device of claim 2, wherein the processing circuit is adapted to:
   decode the payload of the radio block from the received plurality of RF bursts, without receiving the total number of RF bursts for the radio block.

4. The wireless communication device of claim 3, wherein the processing circuit is further adapted to:
   power down at least a portion of the receiver circuit when the payload is successfully decoded from the received plurality of RF bursts.

5. The wireless communication device of claim 1, wherein the plurality of RF bursts comprises two RF bursts, and the total number of RF bursts comprises four RF bursts.

6. The wireless communication device of claim 1, wherein the plurality of RF bursts comprises three RF bursts, and the total number of RF bursts comprises four RF bursts.

7. The wireless communication device of claim 1, wherein the processing circuit adapted to determine from the decoded header whether the radio block is intended for the wireless communication device comprises the processing circuit adapted to:
   compare a temporary flow identifier (TFI) included in the decoded header with a temporary flow identifier (TFI) associated with the wireless communication device.

8. The wireless communication device of claim 1, wherein the processing circuit adapted to power down at least a portion of the receiver circuit comprises the processing circuit adapted to power down at least a portion of the receiver circuit prior to reception of at least one RF burst of the radio block.

9. The wireless communication device of claim 1, wherein each of the coded header bits is associated with the header.

10. The wireless communication device of claim 1, wherein the processing circuit is adapted to determine from the decoded header whether the radio block is intended for the wireless communication device without receiving the total number of RF bursts for the radio block.

11. The wireless communication device of claim 1, wherein the processing circuit is adapted to power down at least a portion of the receiver circuit when the decoded header indicates the radio block is not intended for the wireless communication device without receiving the total number of RF bursts for the radio block.

12. A method operational on a wireless communication device, comprising:
    receiving a plurality of RF bursts of an interleaved radio block, where the plurality of RF bursts includes a number of RF bursts less than a total number of RF bursts for the radio block, and wherein the plurality of RF bursts of the interleaved radio block comprise coded header bits and coded payload bits interleaved together;
    decoding at least a portion of a header from the received plurality of RF bursts; and
    powering down at least a portion of a receiver circuit in response to the decoded header indicating the radio block is not intended for the wireless communication device.

13. The method of claim 12, further comprising:
    decoding a payload of the radio block when the decoded header indicates the radio block is intended for the wireless communication device.

14. The method of claim 13, wherein decoding the payload of the radio block comprises:
    determining a modulation and coding scheme (MCS) for the received plurality of RF bursts to be MCS-5 or MCS-6; and
    decoding the payload of the radio block from the received plurality of RF bursts, without receiving the total number of RF bursts for the radio block.

15. The method of claim 13, wherein decoding the payload of the radio block comprises:
    determining a modulation and coding scheme (MCS) for the received plurality of RF bursts to be MCS-7; and decoding the payload of the radio block from a first three RF bursts and at least a portion of a fourth RF burst.

16. The method of claim 13, wherein decoding the payload of the radio block comprises:
  determining a modulation and coding scheme (MCS) for the received plurality of RF bursts to be MCS-8 or MCS-9;
  receiving four RF bursts; and
  decoding the payload of the radio block from the four received RF bursts.

17. The method of claim 12, wherein receiving the plurality of RF bursts of the radio block comprises:
  receiving two RF bursts or three RF bursts out of a total number of four RF bursts for the radio block.

18. The method of claim 12, further comprising:
  determining an average signal-to-noise ratio associated with the received plurality of RF bursts is above at least one threshold; and
  decoding the header in response to determining the average signal-to-noise ratio is above the at least one threshold.

19. The method of claim 12, wherein powering down at least a portion of a receiver circuit comprises:
  powering down at least a portion of the receiver circuit before receiving at least one RF burst of the radio block.

20. A wireless communication device, comprising:
  means for receiving a plurality of RF bursts of an interleaved radio block, wherein the plurality of RF bursts comprises a number of RF bursts less than a total number of RF bursts for the radio block, and wherein the plurality of RF bursts of the interleaved radio block comprise coded header bits and coded payload bits interleaved together;
  means for decoding a header from the received plurality of RF bursts; and
  means for powering down at least a portion of a receiver circuit when the decoded header indicates the radio block is not intended for the wireless communication device.

21. The wireless communication device of claim 20, further comprising:
  means for decoding a payload of the radio block when the decoded header indicates the radio block is intended for the wireless communication device.

22. The wireless communication device of claim 21, further comprising:
  means for decoding the payload from a number of RF bursts less than the total number of RF bursts for the radio block; and
  means for power down at least a portion of the receiver circuit when the payload is successfully decoded from the number of RF bursts less than the total number of RF bursts for the radio block.

23. The wireless communication device of claim 20, further comprising:
  means for determining from the decoded header whether the radio block is intended for the wireless communication device.

24. A non-transitory computer-readable medium, comprising programming operational on a wireless communication device for:
  receiving a plurality of RF bursts of an interleaved radio block, where the plurality of RF bursts comprises a number of RF bursts less than a total number of RF bursts for the radio block, and wherein the plurality of RF bursts of the interleaved radio block comprise coded header bits and coded payload bits interleaved together;
  decoding a header from the received plurality of RF bursts;
  determining from the decoded header whether the radio block is intended for the wireless communication device; and
  powering down at least a portion of a receiver circuit when the decoded header indicates the radio block is not intended for the wireless communication device.

25. The computer-readable medium of claim 24, further comprising programming operational on a wireless communication device for:
  decoding a payload of the radio block when the decoded header indicates the radio block is intended for the wireless communication device.

26. The computer-readable medium of claim 25, wherein decoding the payload of the radio block comprises:
  determining a modulation and coding scheme (MCS) for the received plurality of RF bursts to be MCS-5 or MCS-6; and
  decoding the payload of the radio block from the received plurality of RF bursts, without receiving the total number of RF bursts for the radio block.

27. The computer-readable medium of claim 25, wherein decoding the payload of the radio block comprises:
  determining a modulation and coding scheme (MCS) for the received plurality of RF bursts to be MCS-7; and
  decoding the payload of the radio block from a first three RF bursts and at least a portion of a fourth RF burst.

28. The computer-readable medium of claim 25, wherein decoding the payload of the radio block comprises:
  determining a modulation and coding scheme (MCS) for the received plurality of RF bursts to be MCS-8 or MCS-9;
  receiving four RF bursts; and
  decoding the payload of the radio block from the four received RF bursts.

29. The computer-readable medium of claim 24, wherein the plurality of RF bursts comprises two RF bursts or three RF bursts out of a total number of four RF bursts for the radio block.

30. The computer-readable medium of claim 24, wherein determining from the decoded header whether the radio block is intended for the wireless communication device comprises:
  determining whether a temporary flow identifier (TFI) in the decoded header matches a temporary flow identifier (TFI) associated with the wireless communication device.

* * * * *